US006606433B2

(12) United States Patent
Oguma et al.

(10) Patent No.: US 6,606,433 B2
(45) Date of Patent: Aug. 12, 2003

(54) OPTICAL MULTI/DEMULTIPLEXER

(75) Inventors: Manabu Oguma, Mito (JP); Akira Himeno, Mito (JP); Kaname Jinguji, Mito (JP); Tsutomu Kitoh, Mito (JP); Yoshinori Hibino, Mito (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 133 days.

(21) Appl. No.: 09/892,939

(22) Filed: Jun. 27, 2001

(65) Prior Publication Data

US 2002/0015554 A1 Feb. 7, 2002

(30) Foreign Application Priority Data

Jun. 28, 2000 (JP) ........................................ 2000-195271

(51) Int. Cl.[7] .......................... G02B 6/34; G02B 6/12; G02B 6/293
(52) U.S. Cl. ............................ 385/37; 385/14; 385/24
(58) Field of Search ............................... 385/37, 24, 14

(56) References Cited

U.S. PATENT DOCUMENTS

2003/0035609 A1 * 2/2003 Hatanaka ........................ 385/15

FOREIGN PATENT DOCUMENTS

JP        11-223736 A * 8/1999 ............... 385/14

OTHER PUBLICATIONS

Kaname Jinguji et al., "Optical Half–Band Filters", *Jour. of Lightwave Tech.*, vol. 18, No. 2, Feb. 2000, pp. 252–259.
T. Saida et al., "Silica–based 2×2 multimode interference coupler with arbitrary power splitting ratio", *Electronics Letters*, 11th Nov. 1999, vol. 35, No. 23, pp. 2031–2033.
K. Takiguchi et al., "Variable group–delay dispersion equaliser based on a lattice–form programmable optical filter", *Electronics Letters*, 20th Jul. 1995, vol. 31, No. 15, pp. 1240–1241.
M. Oguma et al., "Flat–passband interleave filter with 200 GHz channel spacing based on planar lightwave circuit–type lattice structure", *Electronics Letters*, 20th Jul. 2000, vol. 36, No. 15, pp. 1299–1300.
M. Oguma et al., "Four–channel flat–top and low–loss filter for wide passband WDM access network", *Electronics Letters*, Apr. 12, 2001, vol. 37, No. 8, pp. 514–515.
M. Abe et al., "Mach–Zehnder interferometer and arrayed–waveguide–grating integrated multi/demultiplexer with photosensitive wavelength tuning", *Electronics Letters*, 15th Mar. 2001, vol. 37, No. 6, pp. 376–377.
K. Okamoto, "Eight–Channel Flat Spectral Response Arrayed–Waveguide Multiplexer with Asymmetrical Mach–Zehnder Filters", *IEEE Photonics Technology Letters*, vol. 8, No. 3, Mar. 1996, pp. 373–374.

* cited by examiner

*Primary Examiner*—Rodney Bovernick
*Assistant Examiner*—Mike Stahl
(74) *Attorney, Agent, or Firm*—Fitch, Even, Tabin & Flannery (57) ABSTRACT

An optical multi/demultiplexer is provided that has a wide passband and small crosstalk among its all channels. It includes first and second arrayed waveguide gratings and a 2×2 optical signal processor. The 2×2 optical signal processor includes first to fourth directional couplers, and first to third delay lines. The first to third delay lines have thin film heater phase shifters for correcting phase errors involved in fabrication. Utilizing the 2×2 optical signal processor having a transmission spectrum with a square profile having a wide passband and rejection band makes it possible for the optical multi/demultiplexer that combines the arrayed waveguide gratings with the waveguide type circulating filter (2×2 optical signal processor) to widen the extinction bandwidth of the adjacent channel.

16 Claims, 12 Drawing Sheets

PRIOR ART

OPTICAL MULTI/DEMULTIPLEXER

This application is based on Patent Application No. 2000-195271 filed Jun. 28, 2000 in Japan, the content of which is incorporated hereinto by reference.

BACKGROUND OF THE INVENTION

1. Field of the Invention

The present invention relates to an optical multi/demultiplexer for multiplexing optical signals at high density in an optical communication or an optical switching field.

2. Description of the Related Art

Recently, wavelength multiplexing of an increasing number of channels has been studied to meet the growing demand of communication traffic. Besides, because of the limited low-loss bandwidth of optical fibers or the limited low-noise amplification bandwidth of rate-earth doped fiber amplifiers such as Erbium-doped fiber amplifiers, optical multi/demultiplexers that can handle optical signals with a narrower channel spacing are required. Arrayed waveguide gratings (AWGs) are a typical optical multi/demultiplexer to meet such a need.

An arrayed waveguide grating, which can multiplex a large number of signals at once by itself, is applicable to an optical communication system, and is actually used in currently operating optical systems. As for an optical multi/demultiplexer like the arrayed waveguide grating that handles a number of signals (no less than eight waves), unless the crosstalk per channel is very small, it will be inapplicable to an optical communication system because of the cumulative noise. Today, arrayed waveguide gratings with a 100-GHz channel spacing achieve small enough crosstalk of less than −40 dB, and are in mass production already. However, as for the arrayed waveguide gratings with a narrower wavelength spacing of a 10-GHz channel spacing, the volume production has not yet implemented because of a problem in that small crosstalk cannot be obtained unless the phase error at the fabrication is precisely estimated and compensated.

Apart from the arrayed waveguide gratings, there are some optical multi/demultiplexing devices utilizing components such as fiber gratings or thin film filters. However, it is difficult for them to simultaneously satisfy such requirements as channel configuration with a precise wavelength spacing, small excess loss and small loss imbalance of individual channels. Thus, there are proposed optical multi/demultiplexers that can handle only a few channels.

To implement an optical multi/demultiplexer that can handle optical signals at a narrower wavelength spacing, a method is proposed that combines two existing arrayed waveguide gratings with a Mach-Zehnder filter with an FSR (Free Spectral Range) equal to the channel spacing of the arrayed waveguide gratings.

Using this method can construct an optical multi/demultiplexer capable of apparently doubling the number of channels of the arrayed waveguide grating using the existing arrayed waveguide gratings. In addition, since both the arrayed waveguide gratings and the Mach-Zehnder filter can be composed of the same type optical waveguides, the method does not involve any problem of connection loss, and they can be easily integrated on the same substrate. Above all, the method has an advantage of being able to suppress the crosstalk with other channels except for the adjacent channels to sufficiently small value by means of the existing arrayed waveguide gratings.

However, since the Mach-Zehnder filter has a narrow rejection bandwidth, and hence adjacent channels of the optical multi/demultiplexer constructed by the method also has a narrow rejection bandwidth, utilizing the Mach-Zehnder filter with such a transmission spectrum has a problem of being unable to sufficiently improve the adjacent channel crosstalk considering the center wavelength variations of optical signals. Besides, since the optical signal of the channel passes two filters, the passband width becomes narrower. Thus, the optical multi/demultiplexer constructed by combining the Mach-Zehnder filter with the arrayed waveguide gratings has a problem of narrowing the allowed bandwidth of the optical signal wavelength.

SUMMARY OF THE INVENTION

The present invention is implemented to solve the foregoing problems. Therefore, an object of the present invention is to provide an optical multi/demultiplexer that has a wide passband and small crosstalk over all channels, for handling optical signals of multiple wavelengths with narrow channels.

To accomplish the object of the present invention, there is provided an optical multi/demultiplexer including M arrayed waveguide gratings and a waveguide type circulating filter connected in cascade, each of the arrayed waveguide gratings having a same channel spacing and a center wavelength of a channel shifted by an amount of 1/M of the channel spacing, and the waveguide type circulating filter having M periodic output transmission spectra with a repetition period identical to the channel spacing, wherein the waveguide type circulating filter comprising: two optical waveguides; (N+1) directional couplers for coupling the optical waveguides at (N+1) different locations, where N is an integer greater than one; and means for providing the optical waveguides at N locations between the directional couplers with an optical path length difference.

Here, a first directional coupler of the directional couplers may have an angular representation of a coupling coefficient of $0.25\pi$, where the angular representation of the coupling coefficient=$\sin^{-1}\sqrt{\text{(power coupling ratio)}}$, and remaining (N−1) optical path length differences may be given by $\pm 2 mL \pm m'\lambda/2$, where m and m' are integers including zero, $\lambda$ is center wavelength, and L is the optical path length difference of the first optical waveguide. Here, the "power coupling ratio" is defined by $P2/(P1+P2)$ when a light signal is launched into one of the input ports of a directional coupler, where P1 (mW) is optical power output from an output port connected to the input port, and P2 (mW) is optical power output from an output port of the other waveguide.

An (N+1)th directional coupler of the directional couplers may have an angular representation of a coupling coefficient of $0.25\pi$, where the angular representation of the coupling coefficient=$\sin^{-1}\sqrt{\text{(power coupling ratio)}}$, and remaining (N−1) optical path length differences may be given by $\pm 2 mL \pm m'\lambda/2$, where m and m' are integers including zero, $\lambda$ is center wavelength, and L is the optical path length difference of an Nth optical waveguide.

Angular representations of coupling coefficients of the first, second and third directional couplers, and the optical path length differences at first and second locations may be give by one of two sets consisting of $\{\pi/4, (\pi/3)-x, (\pi/12)+x, L, 2L\pm\lambda/2\}$ and $\{\pi/4,(\pi/6)+x, (\pi/12)+x, L, -2L\}$, where $0 \leq x \leq 0.1$.

Angular representations of coupling coefficients of third, second and first directional couplers, and the optical path length differences at second and first locations may be give by one of two sets consisting of {π/4, (π/3)−x, (π/12)+x, L, 2L±λ/2} and {π/4, (π/6)+x, (π/12)+x, L, −2L}, where 0≦x≦0.1.

At least one of the directional couplers may consist of a tunable coupler.

At least one of the two waveguides that provide the N optical path length differences may include a phase shifter.

Thus, the waveguide type circulating filter in accordance with the present invention comprises the two optical waveguides and the (N+1) directional couplers that couple the optical waveguides at (N+1) locations, where N is an integer greater than one. As a result, it can widen the rejection bandwidth of the adjacent channels of the optical multi/demultiplexer including the combination of the arrayed waveguide gratings and the waveguide type circulating filter. It is preferable that the waveguide type circulating filter consist of a 2×2 optical signal processor capable of having transmission spectra with a square profile having a wide passband and rejection band. This enables the crosstalk among all the channels to be suppressed to a small amount even taking account of the center wavelength variations of the optical signal.

As for the transmission channels, since the waveguide type circulating filter has a wide flat-top passband and rejection band, it has an advantage of being able to prevent the reduction of the proper passband the arrayed waveguide gratings.

Thus, utilizing the optical waveguide filter with the configuration in accordance with the present invention can provide an optical multi/demultiplexer with a wide passband and small crosstalk over all the channels, even when doubling the number of channels of the existing arrayed waveguide grating.

As described above, according to the present invention, the waveguide type circulating filter utilizes the 2×2 optical signal processor that comprises the two optical waveguides and the (N+1) directional couplers that couple the optical waveguides at (N+1) locations, where N is an integer greater than one, that provides the optical waveguides with the optical path length differences at N locations between the directional couplers, and that can provide transmission spectra with a square profile having a wide passband and rejection band. As a result, it can widen the rejection bandwidth of the adjacent channels of the optical multi/demultiplexer including the combination of the arrayed waveguide gratings and the waveguide type circulating filter. This enables the crosstalk among all the channels even taking account of the center wavelength variations of the optical signal.

Furthermore, as for the transmission channels, since the waveguide type circulating filter has a wide flat-top passband, it has an advantage of being able to prevent the reduction in the proper passband of the arrayed waveguide gratings.

Thus, utilizing the optical waveguide filter with the configuration in accordance with the present invention can provide an optical multi/demultiplexer with a wide passband and small crosstalk over all the channels, even when doubling the number of channels of the existing arrayed waveguide grating.

The above and other objects, features and advantages of the present invention will become more apparent from the following description of embodiments thereof taken in conjunction with the accompanying drawings.

DESCRIPTION OF THE PREFERRED EMBODIMENTS

The preferred embodiments of the present invention will now be described with reference to the accompanying drawings.

Figure 1:
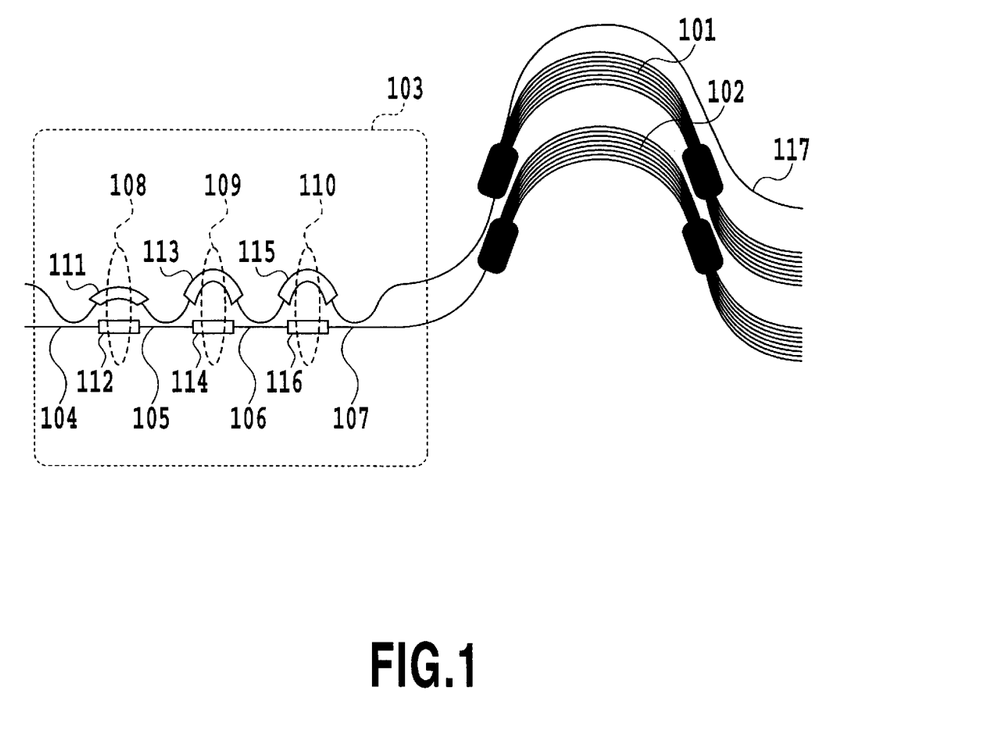
FIG. 1 is a diagram showing a configuration of a first embodiment of the optical multi/demultiplexer in accordance with the present invention.

FIG. 1 is a diagram showing a configuration of a first embodiment of the optical multi/demultiplexer in accordance with the present invention. In this figure, reference numerals 101 and 102 designate first and second arrayed waveguide gratings, and the reference numeral 103 designates a 2×2 optical signal processor constituting a waveguide type circulating filter. The 2×2 optical signal processor 103 comprises first, second, third and fourth directional couplers 104, 105, 106 and 107, and first, second and third delay lines 108, 109 and 110. The first, second and third delay lines 108, 109 and 110 are provided with thin film heater phase shifters 111 and 112, 113 and 114, and 115 and 116 for correcting phase errors involved in fabrication. In addition, to check the adjustment conditions of the thin film heater phase shifters 111, 112, 113, 114, 115 and 116, a monitoring optical waveguide 117 is attached halfway through the arrayed waveguide grating 101.

The arrayed waveguide gratings 101 and 102 have a channel spacing of 100 GHz each with their center wavelengths shifted by 50 GHz. The 2×2 optical signal processor 103 has an FSR of 100 GHz, and is fabricated such that the output ports are switched at every 50 GHz interval. In addition, the angular representations of the coupling coefficients of the first, second, third and fourth directional couplers 104, 105, 106 and 107 are designed to have π/4, 3π/8, π/6 and π/24, respectively, such that the 2×2 optical signal processor 103 has a flat-top spectrum. Furthermore, the first, second and third delay lines 108, 109 and 110 are designed to be L, 2L+λ/2 and 2L+λ/2 long, respectively, where λ=1553. 6 nm, nL=3 mm and n is the effective index of the channel waveguide. The calculation of parameters is carried out by a method described in Jinguji etc., "Optical Half-Band Filters", JOURNAL OF LIGHTWAVE TECHNOLOGY, VOL. 18, NO. 2, FEBRUARY 2000, pp. 252–259.

Although the present embodiment uses the parameters as described above, the combination of the parameters is not only one, so that the present invention is not limited to the combinations of the waveguide parameters of the present embodiment.

Actual waveguides were fabricated by combining a technique of forming a silica-based glass thick film on an Si substrate by flame hydrolysis deposition (FHD) with a waveguide process carried out by photolithography and dry etching. The waveguides finally fabricated had a cross-sectional shape of 7 μm high and 7 μm width, and a relative refractive index difference of 0.75%.

The fabricated waveguides had their end surfaces cut off with a dicing saw, and their input and output waveguides connected to dispersion-shifted fibers which were commonly used in transmission lines in Japan, and then were subjected to estimation. The ASE (Amplified Spontaneous Emission) light emitted from an Erbium-doped optical fiber amplifier was input to the 2×2 optical signal processor 103, and the operating points of the thin film heater phase shifters 111, 112, 113, 114, 115 and 116 were determined with monitoring the light output from the monitor port of the optical waveguide 117 by an optical spectrum analyzer. Afterward, launching the ASE light to the 2×2 optical signal processor 103, the light beams output from the arrayed waveguide gratings 101 and 102 were estimated by the optical spectrum analyzer. After estimating the characteristics of the entire circuit in accordance with the present invention in this way, the arrayed waveguide gratings 101 and 102 were separated from the 2×2 optical signal processor 103 with the dicing saw to estimated the individual transmission spectra.

Figure 2:
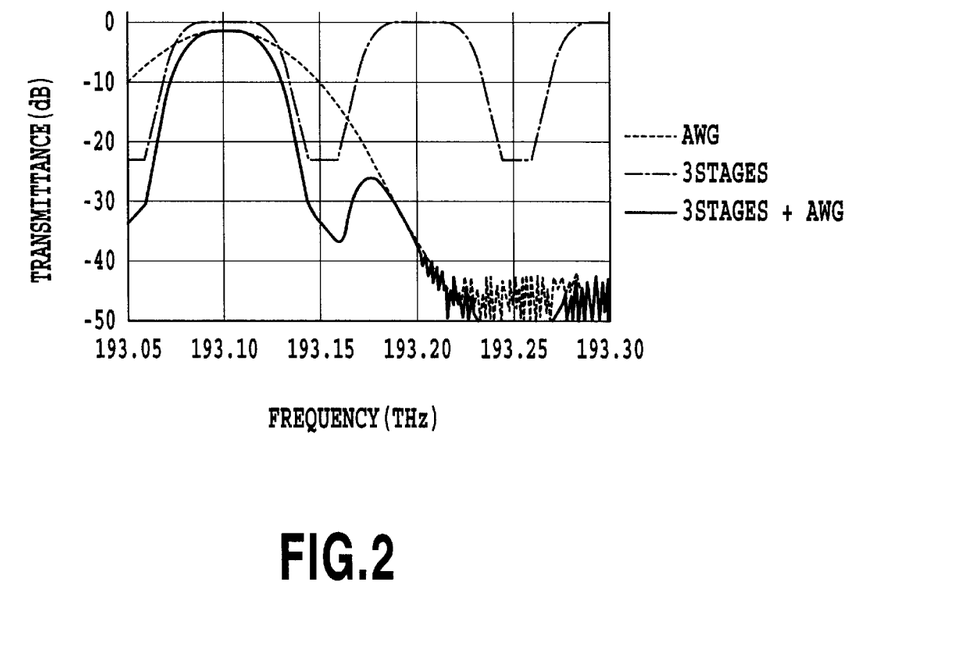
FIG. 2 is a diagram illustrating the transmission characteristic of the first embodiment and transmission characteristics of its components.

FIG. 2 is a graph illustrating the transmission spectrum of the entire circuit near 193.1 THz, that of the arrayed waveguide gratings, and that of the 2×2 optical signal processor. The passband of the arrayed waveguide gratings agrees with that of the 2×2 optical signal processor as a result of appropriately setting the operating points of the phase shifters. It is seen from FIG. 2 that the center wavelength of the passband 193.1 THz is isolated from the light separated apart by 100 GHz or more by the arrayed waveguide grating, and from the 50 GHz adjacent light of the closest channel by the 2×2 optical signal processor, as a result of combining the two optical filters, the arrayed waveguide gratings and the 2×2 optical signal processor plus.

Figure 3:
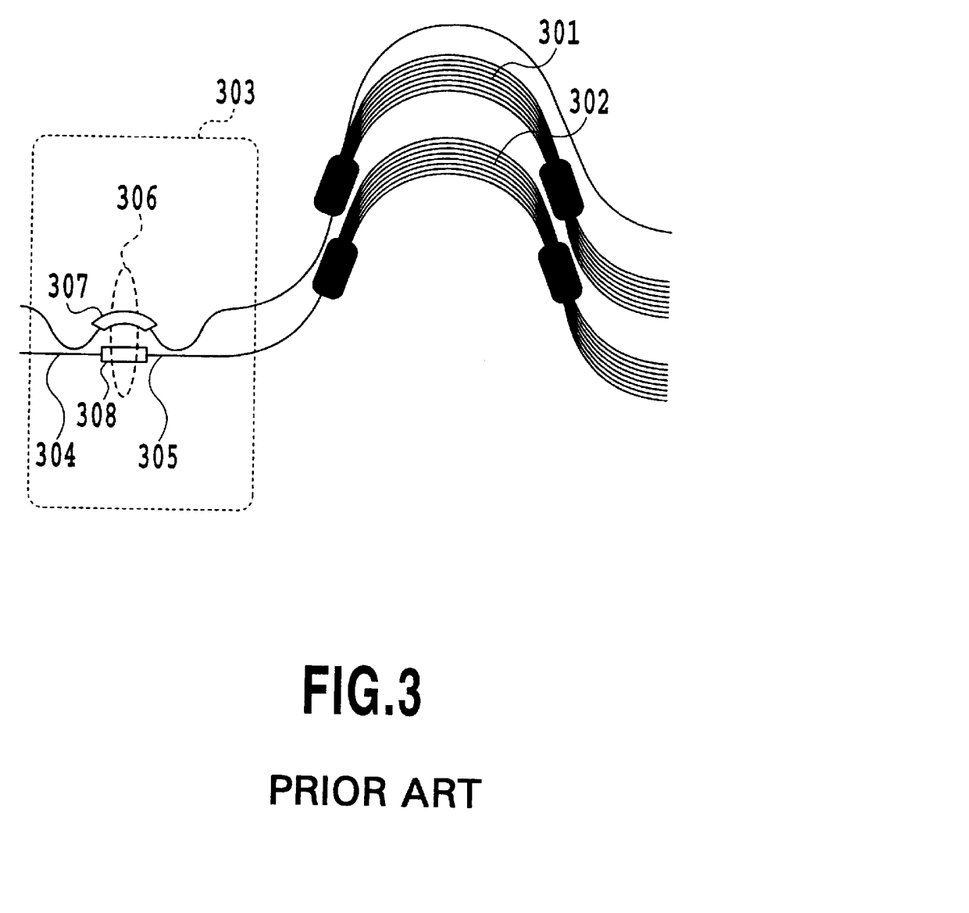
FIG. 3 is a diagram showing a configuration of a conventional optical multi/demultiplexer.
Figure 4:
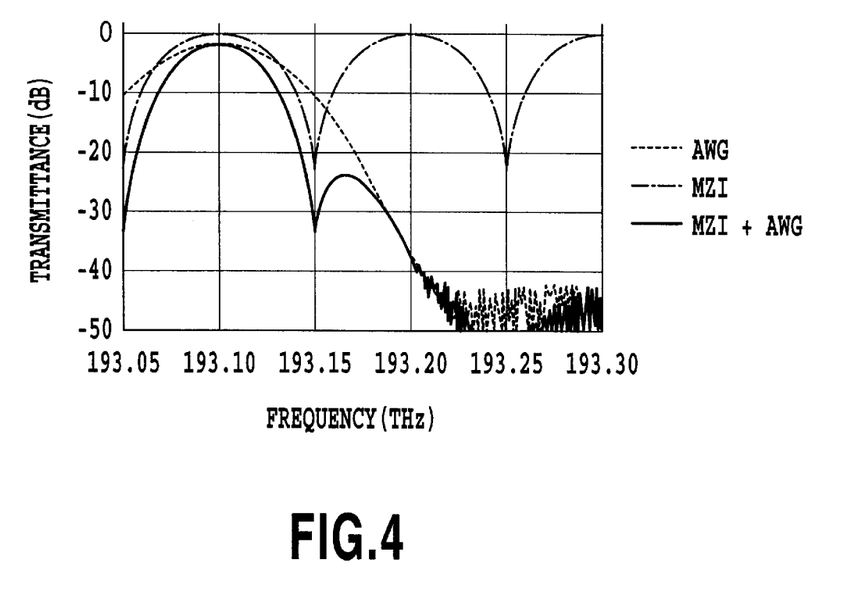
FIG. 4 is a diagram illustrating the transmission characteristic of the conventional optical multi/demultiplexer and transmission characteristics of its components.

FIG. 3 is a diagram showing a conventional optical circuit consisting of a combination of a Mach-Zehnder filter and arrayed waveguide gratings. In this figure, reference numerals 301 and 302 each designate an arrayed waveguide grating; the reference numeral 303 designates a Mach-Zehnder filter; reference numerals 304 and 305 each designate a directional coupler; the reference numeral 306 designates a delay line; and reference numerals 307 and 308 each designate a thin film heater phase shifter. FIG. 4 illustrates transmission characteristics. Here, the transmission characteristics of the conventional optical circuit as illustrated in FIG. 4 will be compared with the transmission characteristics of the optical circuit in accordance with the present invention as shown in FIG. 2.

Figure 5:
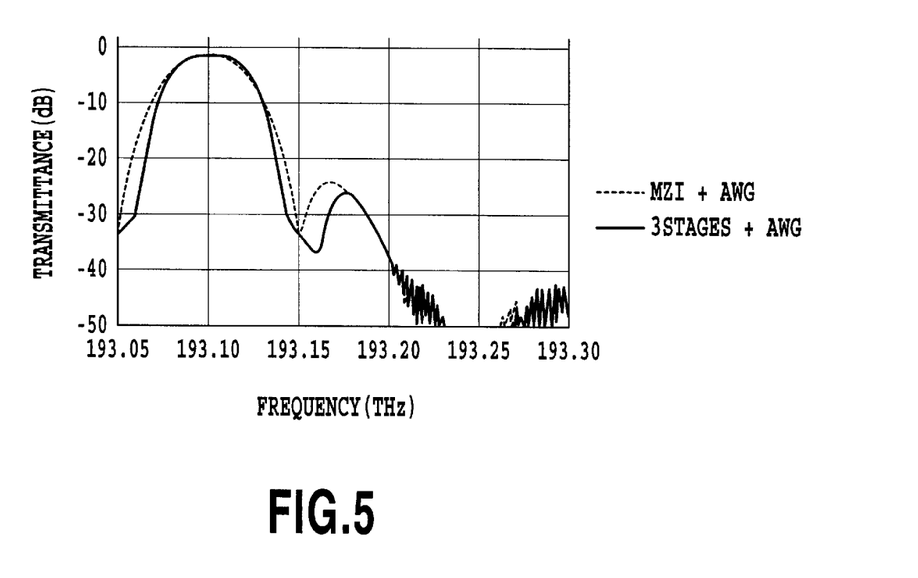
FIG. 5 is a diagram illustrating crosstalk of adjacent channels in the first embodiment and in the conventional optical multi/demultiplexer.

FIG. 5 illustrates the enlarged transmission spectra of the adjacent channels of the transmission characteristics of the two optical circuits. Although the two optical circuits have low crosstalk less than −30dB at 193.15 THz, their rejection bandwidth greatly differ. For example, to achieve the crosstalk of −30 dB or less, although the conventional optical circuit must have a separation of about 49 GHz from the center wavelength of the passband, it is enough for the optical circuit in accordance with the present invention to have a separation of about 45 GHz. In other words, the bandwidth providing the crosstalk of −30 dB or less near the adjacent channel is about 2 GHz in the conventional example, but about 10 GHz in the optical circuit in accordance with the present invention. Comparing with the channel spacing of 50 GHz, although the conventional optical circuit has an rejection range of 4%, the optical circuit in accordance with the present invention has a much wider rejection range of 20%.

Figure 6:
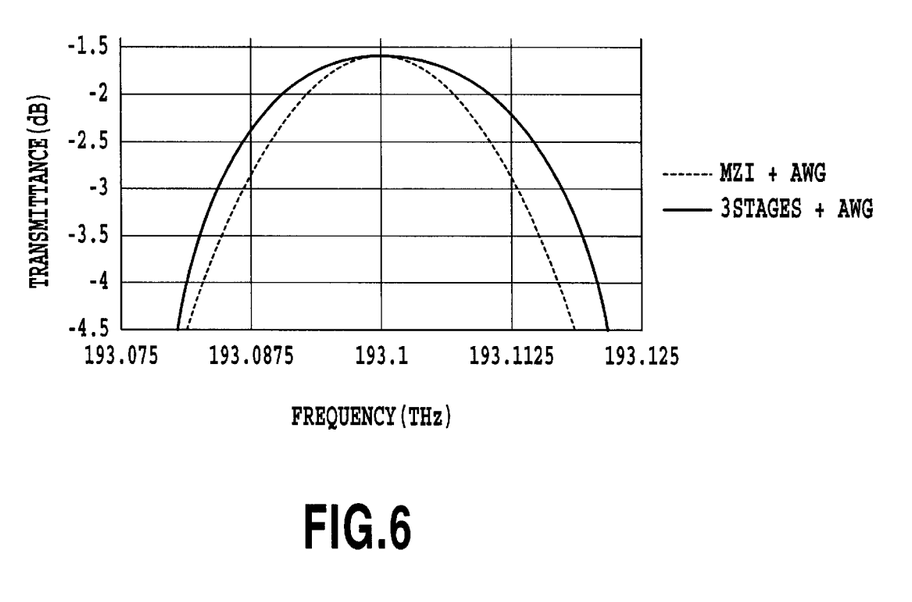
FIG. 6 is a diagram illustrating enlarged spectrum in the passband of the first embodiment and that of the conventional optical multi/demultiplexer.

FIG. 6 illustrates enlarged transmission spectra of the transmission channels of the two circuits. Although the two circuits have little difference in the transmittance at 193.10 THz, they have great differences in the variations in the transmittance with respect to the frequency. Defining a 1-dB passband width as a bandwidth that allows the transmittance degradation down to 1 dB with reference to the transmittance at the center wavelength of the passband, although the conventional optical circuit has a 1-dB passband width of 22 GHz, the optical circuit in accordance with the present invention has a 1-dB passband width of 28 GHz. Comparing with the channel spacing of 50 GHz, it is seen that although the transmittance degradation of less than 1 dB occupies 44% in the conventional optical circuit, it increases to 56% in the configuration of the optical circuit in accordance with the present invention.

Which one of the two waveguides of the 2×2 optical signal processor 103 is to be used as the input waveguide depends on the wavelength allocation of the 2×2 optical signal processor 103 and the two arrayed waveguide gratings 101 and 102. However, since the present example of the optical multi/demultiplexer can switch the input waveguide by shifting its phase by an amount of π by operating the phase shifter 111 or 112, it is unnecessary to specify the input waveguide.

Figure 7:
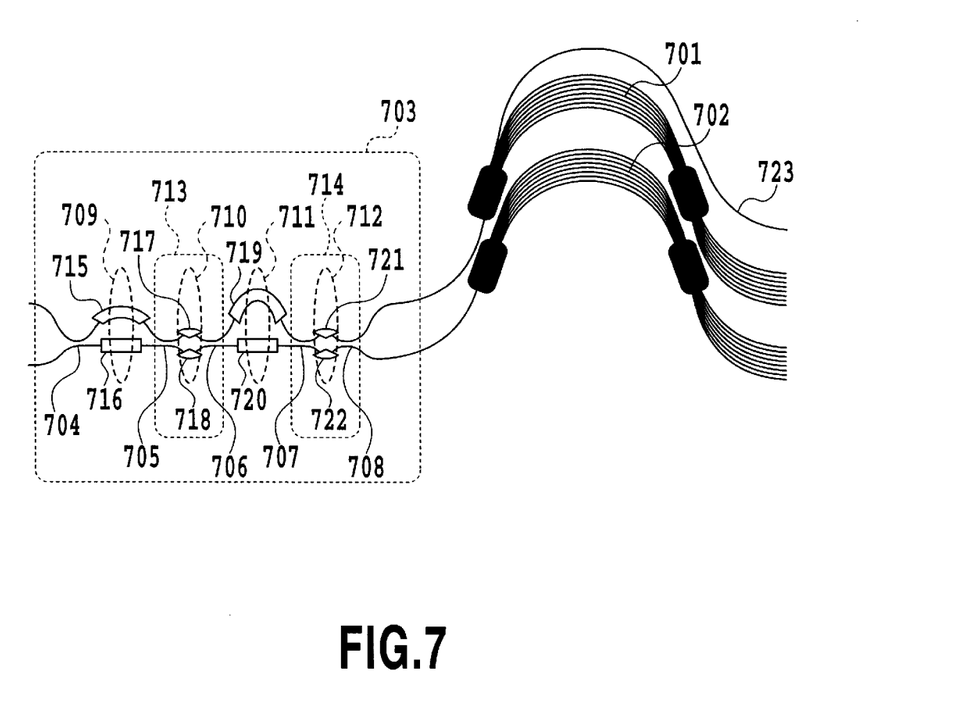
FIG. 7 is a diagram showing a configuration of a second embodiment of the optical multi/demultiplexer in accordance with the present invention.

FIG. 7 is a diagram showing a configuration of a second embodiment of the optical multi/demultiplexer in accordance with the present invention.

The second embodiment has two operation modes: one is to reduce the adjacent channel crosstalk; and the other is to increase the passband width, the details of which will now be described.

The second embodiment comprises two arrayed waveguide gratings 701 and 702, and a 2×2 optical signal processor 703 serving as a waveguide type circulating filter. The 2×2 optical signal processor 703 comprises a directional coupler 704, tunable couplers 713 and 714, and delay lines 709 and 711. The tunable coupler 713 comprises two directional couplers 705 and 706, and a delay line 710 interposed between them. Likewise, the tunable coupler 714 comprises two directional couplers 707 and 708, and a delay line 712 interposed between them. The delay lines 709, 710, 711 and 712 each comprises two of the thin film heater phase shifters 715–722 to correct the phase errors involved in the fabrication. Besides, a monitoring optical waveguide 723 is attached to the midpoint of the arrayed waveguide grating 701 to check the adjustment conditions of the thin film heater phase shifters 715–722.

The delay lines 709 and 711 are designed to have delays of L and 2L+λ/2, respectively, where λ=1553.6 nm, nL=3 mm, and n is an effective index of the channel waveguides. The directional couplers 704, 705, 706, 707 and 708 are all designed to have an angular representation of the coupling coefficient of π/4, and the delay lines 710 and 712 are designed to have delays of λ/6 and 5 λ/12, respectively, where λ=1553.6 nm. Without fabrication errors, the tunable couplers 713 and 714 will have an angular representation of the coupling coefficient of π/3 and π/12, respectively. The target coefficients π/3 and π/12 can be achieved in spite of small phase errors of the directional couplers and optical path lengths because the tunable couplers 713 and 714 can totally adjust their angular representations of the coupling coefficients by operating the phase shifters 717, 718, 721 and 722. In addition, their angular representations of the coupling coefficients can be adjusted to given values such as (π/3)−x, (π/12)+x, etc. The target values of the parameters of the 2×2 optical signal processor of the second embodiment are also computed by the method described in the foregoing reference, Jinguji etc., "Optical Half-Band Filters", JOURNAL OF LIGHTWAVE TECHNOLOGY, VOL. 18, NO. 2, FEBRUARY 2000, pp. 252–259.

Although the present embodiment uses the parameters as described above, the combination of the parameters is not limited to only one. For example, the same effect can be achieved by setting the angular representations of the coupling coefficients at (π/6)+x and (π/12)+x, and the optical path length differences at L and −2L, or by replacing the order of these values. Accordingly, the present invention is not limited to the combinations of the waveguide parameters of the present embodiment.

The actual waveguides of the present embodiment were also fabricated by the combination of the technique of forming a silica-based glass thick film on an Si substrate by flame hydrolysis deposition with the waveguide process carried out by the photolithography and dry etching. The waveguide finally fabricated had a cross-sectional shape of 7 μm high and 7 μm width, and a relative refractive index difference of 0.75%.

The fabricated waveguides were estimated by the same method as that of the first embodiment. Specifically, they had their end surfaces cut off with a dicing saw, and their input and output waveguides connected to dispersion-shifted fibers commonly used as transmission lines in Japan, and were subjected to the estimation. The ASE light emitted from the Erbium-doped optical fiber amplifier was input to the 2×2 optical signal processor 703, and the operating points of the phase shifters 715–722 were determined while monitoring the light output from the monitor port of the optical waveguide 723 by an optical spectrum analyzer. Afterward, launching the ASE light to the end on the 2×2 optical signal processor side, the light beams output from the arrayed waveguide gratings 701 and 702 were estimated by the optical spectrum analyzer. After these measurements followed by estimating the characteristics of the entire circuit in accordance with the present invention in this way, the arrayed waveguide gratings 701 and 702 were separated from the 2×2 optical signal processor 703 with the dicing saw to estimated the individual transmission spectra.

Next, the usage for suppressing the adjacent channel crosstalk will be described along with the characteristics thereof, first.

Figure 8:
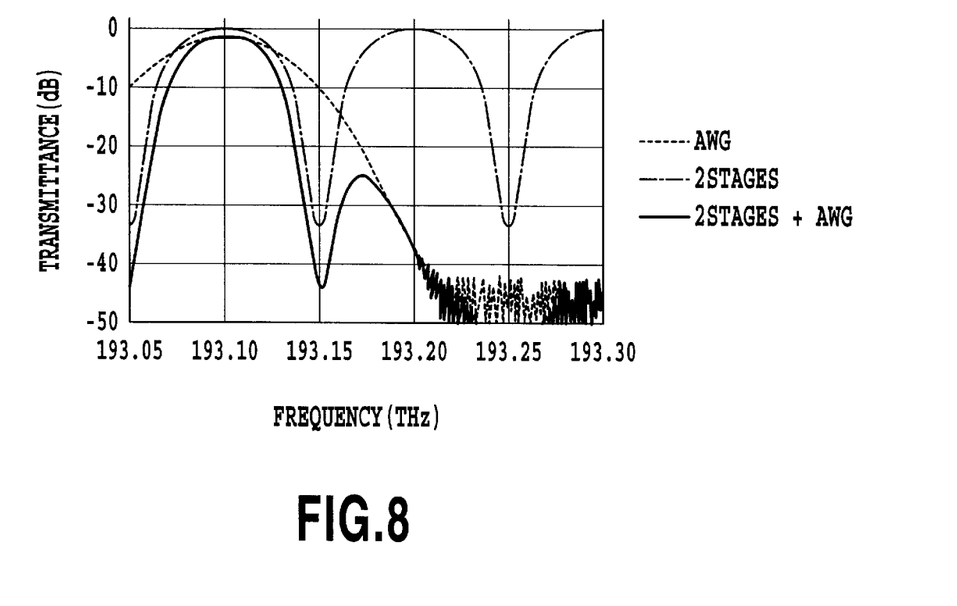
FIG. 8 is a diagram illustrating the transmission characteristic of the second embodiment and transmission characteristics of its components.

FIG. 8 is a diagram illustrating the transmission spectrum of the port whose center wavelength of the passband is 193.1 THz, when the tunable couplers 713 and 714 are adjusted to have angular representations of the coupling coefficients of exactly π/3 and π/12, respectively. The extinction ratio of the 2×2 optical signal processor is greater than that of the first example because the variations involved in fabricating the directional couplers are corrected by using the tunable couplers. As a result, the second embodiment of the optical circuit can achieve the crosstalk of less than −40 dB near the adjacent channel of 193.15 THz.

Next, the usage of increasing the passband width will be described along with the characteristics thereof.

Figure 9:
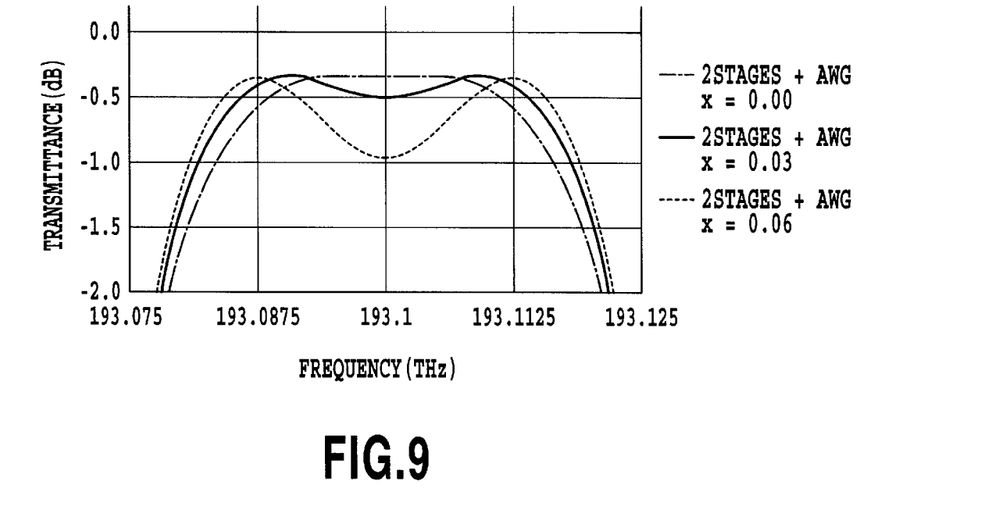
FIG. 9 is a diagram illustrating enlarged spectra of the passband of a 2×2 waveguide type filter constituting the second embodiment.

FIG. 9 illustrates enlarged spectra of the passband of the 2×2 optical signal processor when x=0.00, 0.03 and 0.06, in the case where the tunable couplers 713 and 714 have angular representations of the coupling coefficients of (π/3)−x and (π/12)+x, respectively. At the passband center wavelength of 193.1 THz, although the transmission characteristic is flat when x=0.00, it comes to have a small ripple as the x increases. The curvature of the ripple can be set freely by varying the x. In addition, it is seen that the 1-dB passband width is slightly increases with the increase of the x.

Figure 10:
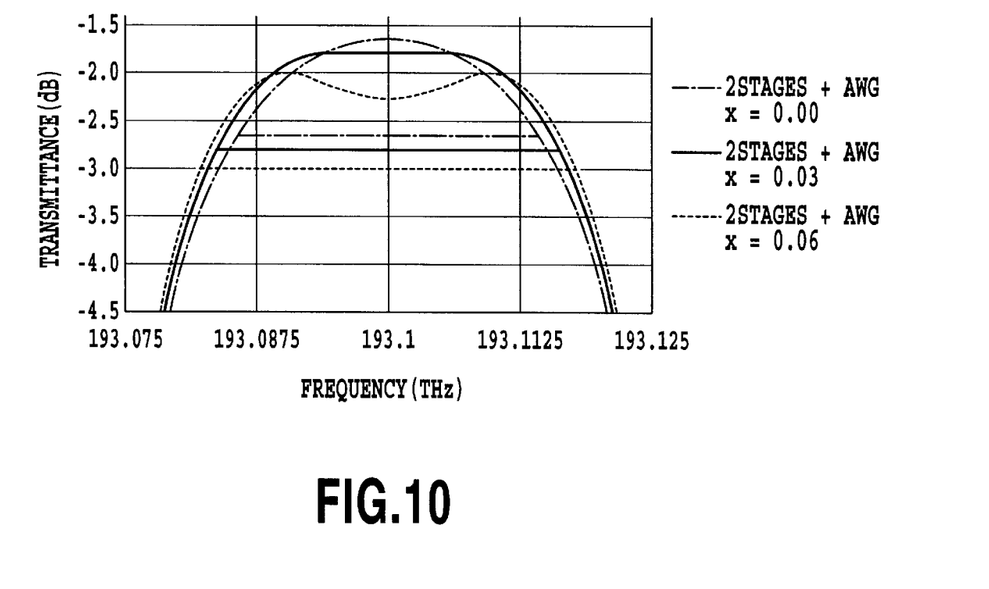
FIG. 10 is a diagram illustrating enlarged spectra of the passband of the second embodiment.

FIG. 10 is a diagram illustrating enlarged spectra of the passband when the 2×2 optical signal processor 703 is combined with the arrayed waveguide gratings 701 and 702, when x=0.00, 0.03 and 0.06. Corresponding to the ripples of FIG. 9, although the spectrum profile in the passband protrudes upward when x=0.00, it protrudes downward when the x increases to 0.06. In the second embodiment, the flat-top region becomes maximum near the center wavelength of the passband when the x=0.03.

Table 1 shows minimum losses in the passband, losses at the center wavelength of the passband, 1-dB passband widths from the minimum losses in the passband and ratios of the 1 dB bandwidth and the channel spacing, when the x is 0.00, 0.03 and 0.06, respectively.

TABLE 1

| x | 0.00 | 0.03 | 0.06 |
|---|---|---|---|
| minimum loss (dB) | 1.65 | 1.80 | 2.03 |
| loss at center wavelength | 1.65 | 1.80 | 2.28 |
| 1-dB width (GHz) | 27.5 | 30 | 35 |
| 1-dB width/ch spacing | 55% | 60% | 70% |

When x=0.03, although the minimum loss in the passband is degraded by a little less than 0.2 dB, the flattest-top profile is achieved near the passband center wavelength. On the other hand, when x=0.06, although the minimum loss in the passband is degraded by a little less than 0.4 dB and a ripple of a little less than 0.3 dB occurs, the 1-dB passband width is maximum among the 1-dB passband widths when x=0, 0.03 and 0.06, and reaches 35 GHz. In that case, the 1-dB passband width against the channel width of 50 GHz is as large as about 70%.

In the second embodiment, although the flat-top region is maximum near the center wavelength of the passband when x=0.03, the final profile of the passband depends on the value of x and the design of arrayed waveguide gratings. However, the value x=0.00–0.10 can usually implement the flat-top region becomes maximum, and the maximum 1-dB passband width.

As in the first embodiment, it depends on the wavelength allocation of the 2×2 optical signal processor 703 and the two arrayed waveguide gratings 701 and 702 which one of the two waveguides of the 2×2 optical signal processor 703 is to be used as the input waveguide in the second embodiment. However, since the present embodiment of the optical multi/demultiplexer can also switch the input waveguide by shifting its phase by an amount of π by operating the phase shifter 715 or 716, it is unnecessary to specify the input waveguide. The present invention is not limited to the combinations of the waveguide parameters of these embodiments.

Figure 11:
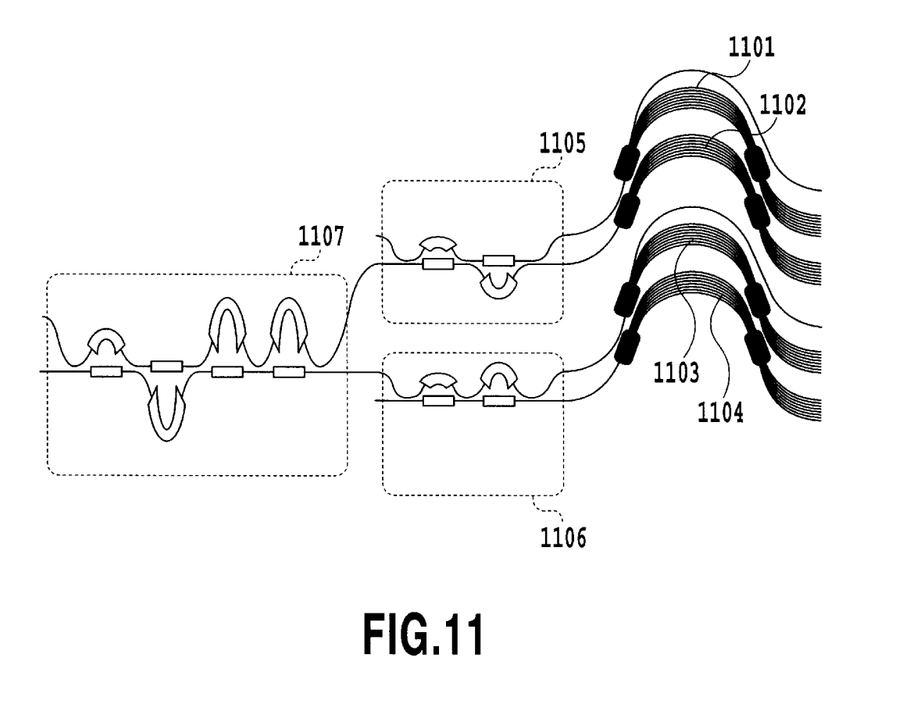
FIG. 11 is a diagram showing a configuration of a third embodiment of the optical multi/demultiplexer in accordance with the present invention.

FIG. 11 is a diagram showing a configuration of a third embodiment of the optical multi/demultiplexer in accordance with the present invention.

The third embodiment of the optical multi/demultiplexer comprises four arrayed waveguide gratings 1101, 1102, 1103 and 1104, and three 2×2 optical signal processors 1105, 1106 and 1107 serving as a waveguide type circulating filter. The channel spacing of the four arrayed waveguide gratings is made equal to the FSR of the two 2×2 optical signal processors 1105 and 1106 and to the channel spacing of the 2×2 optical signal processor 1107. Besides, the center wavelengths of the four arrayed waveguide gratings shift from each other by a quarter wavelength of the channel spacing of the arrayed waveguide gratings, and the center wavelengths of the 2×2 optical signal processors 1105 and 1106 are designed to be shifted by half the channel spacing of the arrayed waveguide gratings.

The optimum values of the parameters of the three 2×2 optical signal processors in the third embodiment are also computed by the method described in Jinguji etc., "Optical Half-Band Filters", JOURNAL OF LIGHTWAVE TECHNOLOGY, VOL. 18, NO. 2, FEBRUARY 2000, pp. 252–259.

Figure 12:
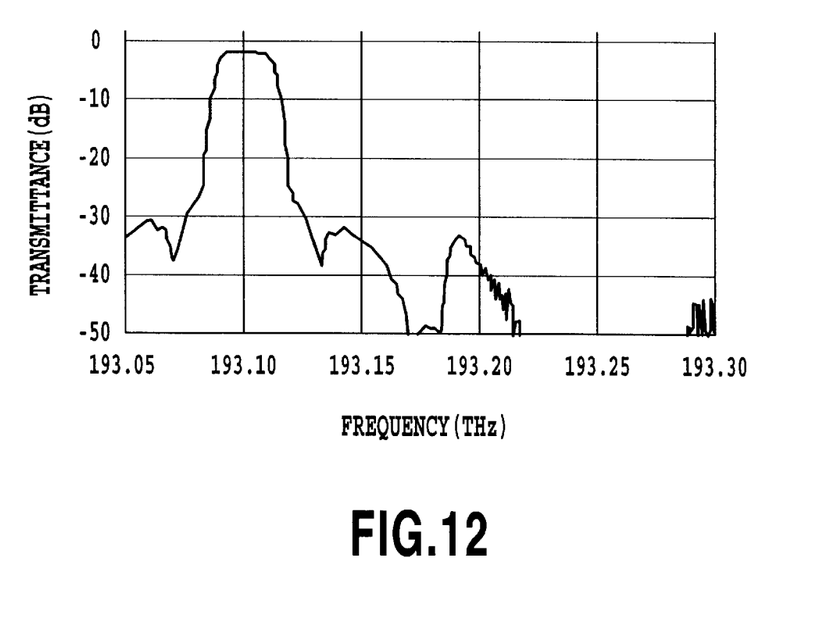
FIG. 12 is a diagram illustrating the transmission characteristic of the third embodiment.

The optical multi/demultiplexer of the third embodiment was fabricated and estimated in the same manner as that of the first and second embodiment. FIG. 12 illustrates the transmission characteristic of the optical multi/demultiplexer of the third example. In the third embodiment the nearest adjacent channel is 193.125 THz, which is closer to the channel of 193.125 THz than the closest adjacent channel in the first and second embodiments of the optical multi/demultiplexer. FIG. 12 illustrates that the crosstalk of a little less than −30 dB takes place near the 193.125 THz. In addition, a flat-top transmission characteristic is obtained near the passband frequency of 193.1 THz.

In the configuration of the third embodiment of the optical multi/demultiplexer as shown in FIG. 11, there are many combinations of the design parameters of the 2×2 optical signal processors such as the number of stages of the 2×2 optical signal processors, the plus or minus of the delay amounts of the delay lines, and the angular representations of the coupling coefficients of the directional couplers. In addition, it is unnecessary for the 2×2 optical signal processors 1105 and 1106 to take the same configuration. There are several configurations that provide the same effect such as changing the waveguide to be connected to the 2×2 optical signal processor 1107.

Furthermore, although the third embodiment employs four arrayed waveguide gratings and three 2×2 optical signal processors, their numbers are not limited to those numbers. For example, using eight arrayed waveguide gratings and seven 2×2 optical signal processors makes it possible to fabricate a multi-channel, low crosstalk, wide passband optical multi/demultiplexer. In other words, although the configuration of the third example of the optical multi/demultiplexer is shown in FIG. 11, the present invention is not limited to the combinations of the design parameters of the 2×2 optical signal processors, or to the combinations of the arrayed waveguide gratings and the 2×2 optical signal processors of the present embodiment.

Thus, the present invention is not limited to the embodiments used for describing the configurations and operations in accordance with the present invention. For example, although the silica-based optical waveguides are used in the foregoing embodiment, it is also possible to form the optical waveguide circuits using other materials such as semiconductors, $LiNbO_3$ and polymer. Furthermore, although the 2×2 optical signal processors of the foregoing embodiments employ the directional couplers, all or part of the directional couplers can be replaced by MMIs (MultiMode Interference couplers), or by multimode interference couplers with arbitrary power splitting ratio consisting of a combination of MMIs and delay lines with similar effect but for an increase in the loss. An example of the multimode interference couplers with arbitrary power splitting ratio consisting of a combination of MMIs and delay lines is described by T. Saida et al., "Silica-based 2×2 multimode interference coupler with arbitrary power splitting ratio", Electron Lett., 1999, vol. 35, pp. 1–2. Moreover, although the foregoing embodiments utilize the thermooptic effect as a phase control method, other control methods can also be used utilizing electrooptic effect, refractive index change induced by irradiation etc.

The present invention implements the optical multi/demultiplexer with a good transmittance spectrum by utilizing the fact that the 2×2 signal processor has a high degree of design flexibility in the transmittance. The 2×2 signal processors employed in the present invention have a high degree of design flexibility in the group delay characteristics of the optical signals passing through them, and are studied intensively. An example of the 2×2 signal processor achievable of an arbitrary group delay is disclosed in Takiguchi etc. "Variable group delay dispersion equalizer based on a lattice form programmable optical filter", Electron Lett., 1995, vol. 31, pp. 1240–1241. It can control the group delay of the optical multi/demultiplexer in its entirety such as canceling the group delays with each other because it utilizes the group delays of the arrayed waveguide gratings using taper waveguides or parabola waveguides, or the group delays of the 2×2 signal processor itself, by combining them.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An optical multi/demultiplexer including M arrayed waveguide gratings and a waveguide type circulating filter connected in cascade, each of the arrayed waveguide gratings having a same channel spacing and a center wavelength of a channel shifted by an amount of 1/M of the channel spacing, and the waveguide type circulating filter having M periodic output transmission spectra with a repetition period identical to the channel spacing, wherein said waveguide type circulating filter comprising:

two optical waveguides;

(N+1) directional couplers for coupling said optical waveguides at (N+1) different locations, where N is an integer greater than one; and means for providing said optical waveguides at N locations between said directional couplers with an optical path length difference.

2. The optical multi/demultiplexer as claimed in claim 1, wherein a first directional coupler of said directional couplers has an angular representation of a coupling coefficient of $0.25\pi$, where the angular representation of the coupling coefficient=$\sin^{-1}\sqrt{(\text{power coupling ratio})}$, and remaining (N−1) optical path length differences are given by $\pm 2 mL \pm m'\lambda/2$, where m and m' are integers including zero, $\lambda$ is center wavelength, and L is the optical path length difference of the first optical waveguide.

3. The optical multi/demultiplexer as claimed in claim 2, wherein angular representations of coupling coefficients of the first, second and third directional couplers, and the optical path length differences at first and second locations are give by one of two sets consisting of $\{\pi/4, (\pi/3)-x, (\pi/12)+x, L, 2L\pm\lambda/2\}$ and $\{\pi/4, (\pi/6)+x, (\pi/12)+x, L, -2L\}$, where $0 \leq x \leq 0.1$.

4. The optical multi/demultiplexer as claimed in claim 3, wherein at least one of said directional couplers consists of a tunable coupler.

5. The optical multi/demultiplexer as claimed in claim 3, wherein at least one of the two waveguides that provide the N optical path length differences includes a phase shifter.

6. The optical multi/demultiplexer as claimed in claim 2, wherein at least one of said directional couplers consists of a tunable coupler.

7. The optical multi/demultiplexer as claimed in claim 2, wherein at least one of the two waveguides that provide the N optical path length differences includes a phase shifter.

8. The optical multi/demultiplexer as claimed in claim 1, wherein an (N+1)th directional coupler of said directional couplers has an angular representation of a coupling coefficient of $0.25\pi$, where the angular representation of the coupling coefficient=$\sin^{-1}\sqrt{(\text{power coupling ratio})}$, and remaining (N−1) optical path length differences are given by $\pm 2 mL \pm m'\lambda/2$, where m and m' are integers including zero, $\lambda$ is center wavelength, and L is the optical path length difference of an Nth optical waveguide.

9. The optical multi/demultiplexer as claimed in claim 8, wherein angular representations of coupling coefficients of third, second and first directional couplers, and the optical path length differences at second and first locations are give by one of two sets consisting of $\{\pi/4, (\pi/3)-x, (\pi/12)+x, L, 2L\pm\lambda/2\}$ and $\{\pi/4, (\pi/6)+x, (\pi/12)+x, L, -2L\}$, where $0 \leq x \leq 0.1$.

10. The optical multi/demultiplexer as claimed in claim 9, wherein at least one of said directional couplers consists of a tunable coupler.

11. The optical multi/demultiplexer as claimed in claim 9, wherein at least one of the two waveguides that provide the N optical path length differences includes a phase shifter.

12. The optical multi/demultiplexer as claimed in claim 8, wherein at least one of said directional couplers consists of a tunable coupler.

13. The optical multi/demultiplexer as claimed in claim 8, wherein at least one of the two waveguides that provide the N optical path length differences includes a phase shifter.

14. The optical multi/demultiplexer as claimed in claim 1, wherein at least one of said directional couplers consists of a tunable coupler.

15. The optical multi/demultiplexer as claimed in claim 14, wherein at least one of the two waveguides that provide the N optical path length differences includes a phase shifter.

16. The optical multi/demultiplexer as claimed in claim 1, wherein at least one of the two waveguides that provide the N optical path length differences includes a phase shifter.

* * * * *